Dec. 13, 1960 L. T. FUQUA 2,964,350
ADJUSTABLE LICENSE PLATE ASSEMBLY
Filed Aug. 25, 1958 2 Sheets-Sheet 1

INVENTOR.
Lloyd T. Fuqua
BY
ATTORNEY

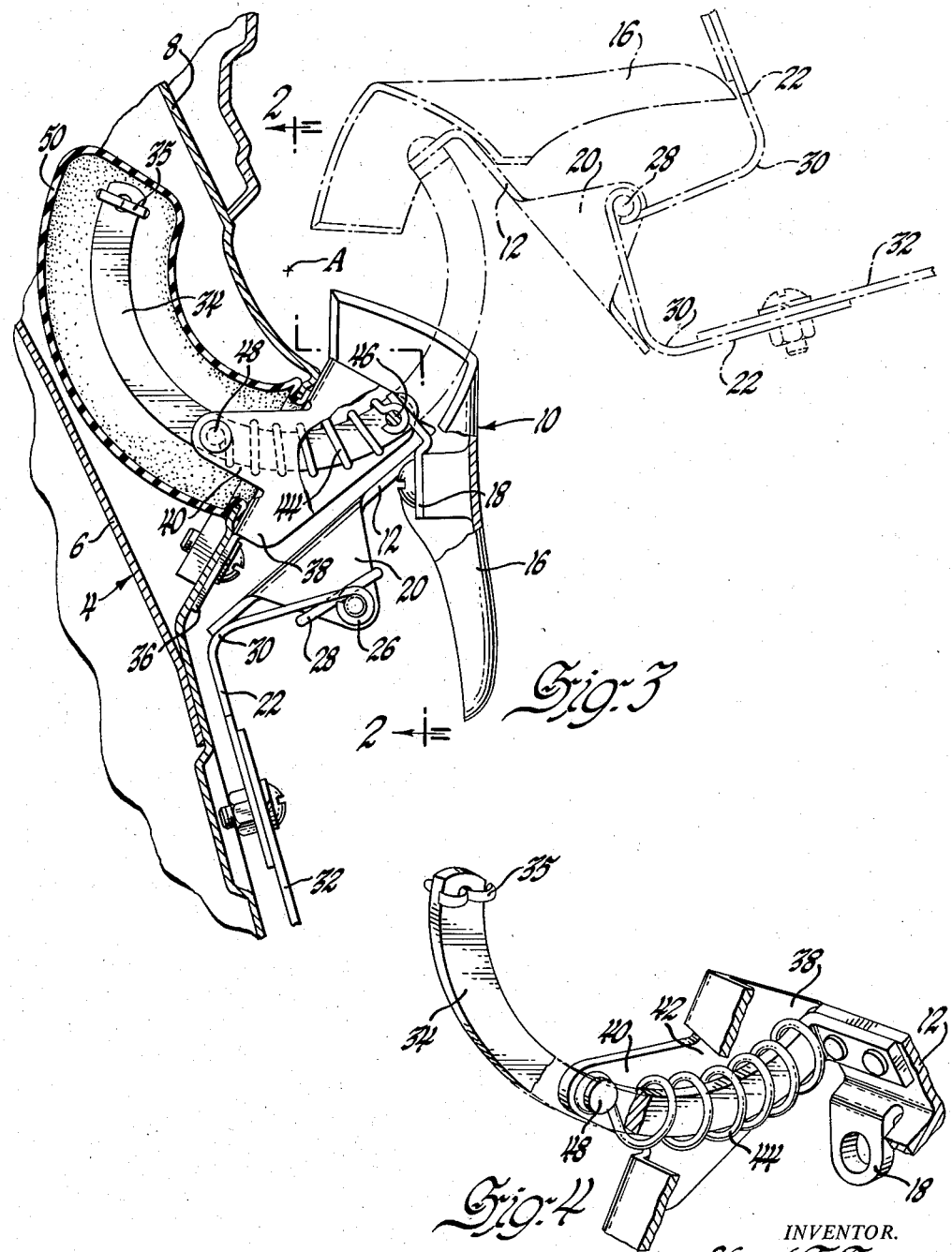

United States Patent Office 2,964,350
Patented Dec. 13, 1960

2,964,350

ADJUSTABLE LICENSE PLATE ASSEMBLY

Lloyd T. Fuqua, Fortville, Ind., assignor to General Motors Corporation, Detroit, Mich., a corporation of Delaware Filed Aug. 25, 1958, Ser. No. 756,826

7 Claims. (Cl. 296—57)

This invention pertains to an adjustable license plate support assembly and, in particular, to such an assembly susceptible of having an axis of pivotal adjustment in space beyond the structure on which the license plate support is to be mounted.

While it is desirable to use simple hinges for mounting certain license plate support assemblies, it is not always possible to obtain the desired pivotal license plate movement by using such hinges. Thus, to obtain such desired pivotal movement, the axis of pivotal adjustment may be in space beyond the vehicle.

It is, therefore, a general object and feature of this invention to provide an adjustable license plate assembly comprising support means cooperating with a vehicle body structure to establish any desired axis of license plate pivotal adjustment even though such axis may be in space beyond the vehicle body structure.

It is another object and feature of this invention to provide a relatively simple and inexpensive device of the type aforementioned which includes cooperating coiled springs defining a track and support arms engaged therein establishing any desired axis of pivotal adjustment of the license plate assembly, one or the other of the springs or arms being fixedly supported on the vehicle while the other is rigidly secured to a license plate holder or support.

It is a more specific object and feature of this invention to provide such an adustable license plate assembly for the pivotally mounted tailgate of a vehicle, such as a station wagon, whereby the license plate assembly may be adjusted to and retained in any desired position relative to the vehicle tailgate as the latter is moved to any position between its fully open and closed positions.

In general, these and other objects of this invention are attained by providing a pair of axially coiled springs secured substantially interiorly of a vehicle body structure, such as a station wagon tailgate, and adapted to receive curved rigid support arms secured to a holder on which a license plate is mounted. The aforementioned support arms are received within the coiled springs which assume the curvature of the support arms to frictionally and yieldably maintain the license plate holder in any selected adjusted position. The curvature of the support arms may be selected to provide any desired degree or range of license plate adjustment even though the axis of such adjustment falls in space beyond the vehicle.

The nature of the structure which attains the objects aforementioned will become more apparent hereinafter as the description of the invention proceeds, and in which reference is made to the following drawings in which:

Figure 3 is a view taken on line 3—3 of Figure 2, again partially broken away and in section to illustrate certain details; and Figure 4 is a fragmentary perspective view of certain parts of the structure.

Figure 1:
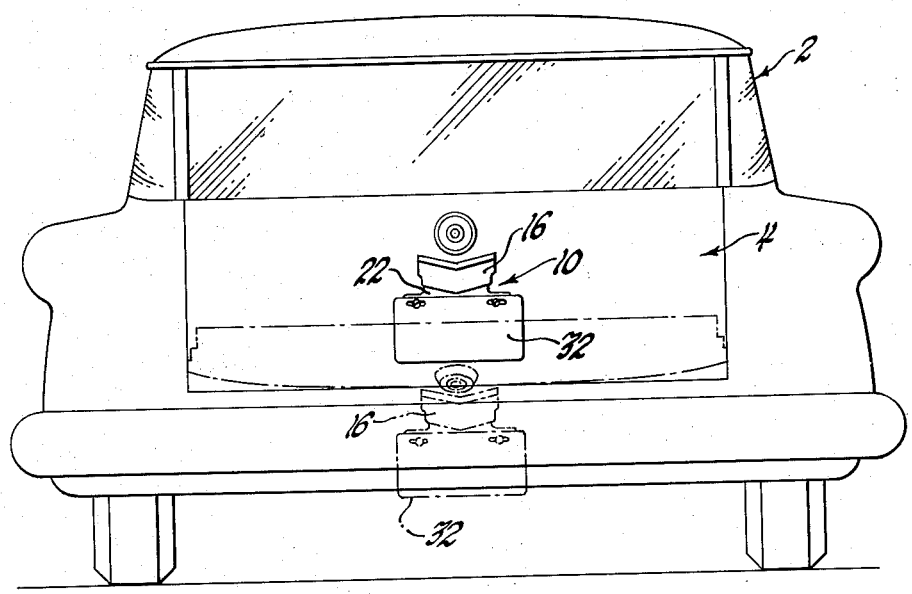
Figure 1 is a rear elevation of a station wagon equipped with the invention.
Figure 2:
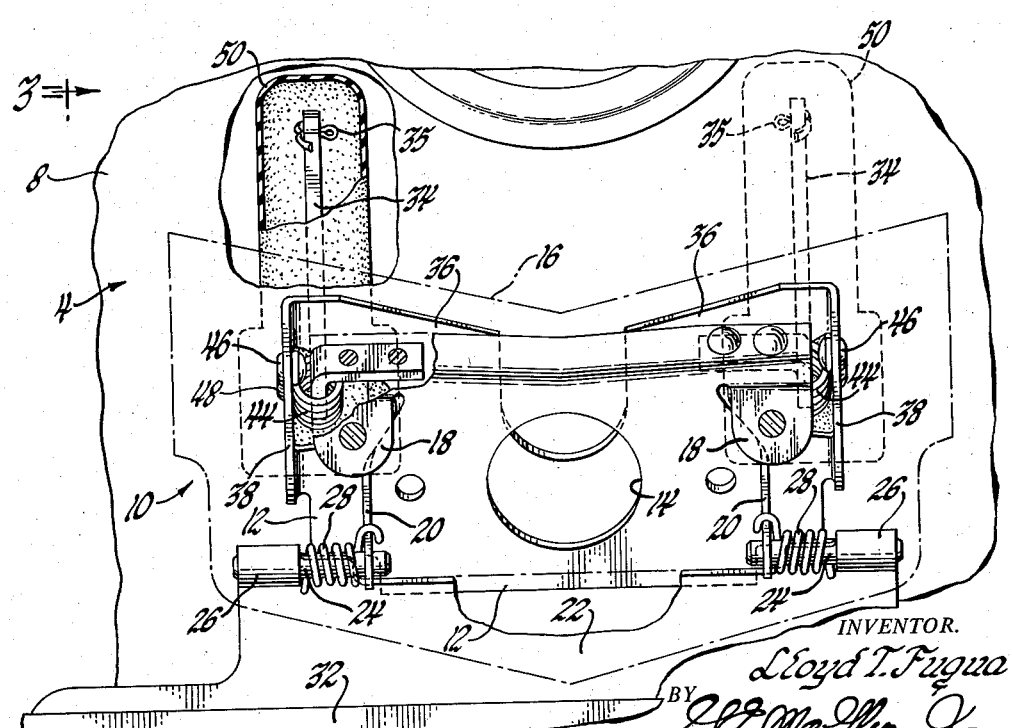
Figure 2 is a fragmentary enlarged view corresponding to Figure 1 and taken on line 2—2 of Figure 3, and in which parts are partially broken away and in section to illustrate certain details of the invention.

Referring now to the drawings, there is shown a vehicle 2, such as the well-known station wagon, having a tailgate 4 hinged on a transverse horizontal axis adjacent its lower edge for movement between the fully closed solid line and fully opened dotted line positions of Figure 1. The tailgate includes the spaced transversely extending structural panel members 6 and 8. The license plate support assembly 10 is mounted on the tailgate 4.

The aforementioned assembly 10 includes a support plate or bracket 12 having a substantially centrally located aperture 14 in which a license plate lamp, not shown, may be suitably secured. A shield 16 may be suitably fixedly secured to the laterally spaced ears 18 of the support plate 12 so as to direct the major portion of the light from the license lamp toward the license plate. The support plate 12 is provided with a pair of laterally spaced rearwardly bent and projecting ears 20 to which the license plate holder 22 is adapted to be hingedly mounted. The aforementioned hinged mounting includes hinge pins 24 secured to and extending between each of the ears 20 and a rolled flange 26 on each side of the holder 22 to define a horizontally extending transverse hinge axis. The springs 28 are mounted about the hinge pins 24, and each has its ends engaged with the respective ears 20 and holder 22 so as to normally urge the curved intermediate portion 30 of the license plate holder into abutment with the support plate 12. The holder 22 is provided with the usual elongate openings receiving fastening means to mount the license plate 32 thereon. A pair of rigid curved support arms 34 are suitably fixedly secured in laterally spaced relation to the rear face of the support plate 12, the terminal end of each arm being provided with a cotter key 35 for a purpose described below.

A mounting bracket 36 is suitably secured to the tailgate body panel 8 and has a pair of laterally spaced rearwardly bent and projecting flanges or ears 38 and similarly spaced forwardly projecting ears 40 struck therefrom to define an opening 42 through the mounting plate. The respective flanges or ears 38 and 40 are substantially aligned so as to mount thereon the axially coiled springs 44. The ends of each spring 44 are looped about the rivets 46 and 48 secured, respectively, to each ear 38 and 40. The ends of each spring 44 are loosely mounted on the rivets so as to be pivotally adjustable thereon. Each opening 42 in the mounting bracket 36 communicates with an elongate curved shroud or cover member 50 suitably secured to the body panel 8 and extending into the space between the tailgate body panels 6 and 8. The springs 44 are mounted so as to extend through the bracket openings 42 and partially into the cover members 50.

From the above description it will be apparent that the mounting bracket 36 and cover members 50 are secured to the tailgate structure 4. The support bracket 12, license plate holder 22, support arms 34 and shield 16 are secured together to form a sub-assembly. In installing the assembly, it will be appreciated that the springs 44 will initially extend with their axes in a straight line between the respective rivets 46 and 48. However, upon inserting the respective support arms 34 into each coiled spring, the latter will assume the curvature of the arms thereby yieldably and frictionally embracing the latter. Thereafter, keys 35 are mounted on the ends of arms 34.

It will be appreciated that the license plate assembly will be disposed as shown in solid line in Figure 1 with the tailgate in its normal closed position. If it is desired to lower the tailgate partially or to the fully open dotted line position of Figure 1, it will be apparent that the license plate support plate 12 must be pivoted to a new position depending from the tailgate if it is to be viewable from a trailing vehicle. Thus, prior to lowering the tailgate, the license plate support bracket 12 will be swung outwardly and away from the tailgate, while the support arms 34 slide within the coiled springs 44. With the tailgate fully open, the assembly is disposed in the dotted line position of Figure 3 with curved portion 30 of holder 22 abutting support bracket 12. The key 35 at the terminal end of each of the arms 34 will cooperate with the end coil of each of the springs 44 to limit outward movement of the license plate support bracket 12. With the license plate assembly so adjusted, the tailgate may be lowered with the license plate disposed in a viewable position from the rear as aforedescribed.

After fully lowering the vehicle tailgate 4 and adjusting the license plate assembly to the dotted line position of Figure 1, it will be obvious that the license plate 32 may stride an obstruction while the vehicle travels over the roadway. It is for this reason that the spring hinge connection comprising pins 24 and springs 26 are provided to enable the license plate holder 22 to pivot upwardly from support bracket 12 as indicated in dotted line in Figure 3 to permit the obstruction to pass. Once the vehicle rides over the obstruction, the springs 26 return the holder 22 to the normal position with curved portion 30 thereof in abutment with support bracket or plate 12.

It will be noted from the above description that the coiled springs 44 will accommodate any pre-selected curvature of the support arms 34 to provide a hinge or pivot axis of license plate adjustment which will afford the range or degree of license plate movement required in a particular installation. Thus, as compared to a simple hinge pin which might be secured to a tailgate body panel, the mounting of this invention can be designed to provide any desired pivot axis, although the latter does not coincide with any portion of the tailgate structure or, for that matter, is actually an axis A in space beyond the tailgate structure. Of course, axis A is substantially coincident with the center of curvature of arms 34.

Moreover, use of the coiled springs 44 in forming a track for cooperation with the support arms 34 results in a simple and versatile construction which will provide any desired hinge axis. Thus, if it is desired to provide a different axis of pivotal adjustment of the license plate assembly, it is only necessary to provide arms of the desired curvature which will cooperate in the manner aforementioned with the coiled springs 44 thereby not requiring replacement of the latter.

Having disclosed a preferred embodiment of the invention, it is to be understood to be by way of illustration only, and is in no way intended to limit the scope of the invention which is defined by the claims which follow.

I claim:

1. An adjustable license plate assembly comprising an axially coiled spring, means mounting the ends of said spring at spaced points on a fixed support, a license plate support, and a curved support arm secured to said license plate support and extending through said spring so that the latter conforms to the curvature of and frictionally engages said support arm.

2. An adjustable license plate assembly comprising an axially coiled spring, means for pivotally mounting the opposite ends of said spring at spaced points on a fixed support, a license plate support, and a curved support arm secured to said license plate support and extending through said spring so that the latter conforms to the curvature of and frictionally engages said support arm.

3. In combination with a vehicle having a body panel, an adjustably mounted license plate assembly; said assembly comprising an axially coiled spring having its opposite ends pivotally mounted at spaced points on said body panel, a license plate holder on which a license plate may be mounted, and an arcuate arm secured to said holder and engaged in said spring and having a center of curvature spaced from said body panel.

4. In combination with a vehicle having a body panel, an adjustably mounted license plate assembly; said assembly comprising an axially coiled spring having its opposite ends pivotally mounted at spaced points on said body panel, a license plate holder on which a license plate may be mounted, and an arcuate arm secured to said holder and engaged in said spring, said arm having a center of curvature spaced from said body panel so that said spring conforms to the shape of and frictionally engages said arm.

5. In combination with a pivotally mounted vehicle tail gate including spaced body panels, an adjustable license plate assembly; said assembly comprising an axially coiled spring, said spring being pivotally mounted relative to said tail gate to define a track communicating with the space between said body panels, a license plate support member, and a curved support arm secured to said member and extending through said spring whereby the latter conforms to the shape of and frictionally engages said support arm, said curved support arm having a center of curvature spaced beyond said body panels.

6. An adjustable license plate assembly comprising an axially coiled spring, means mounting the ends of said spring at spaced points on a fixed support, one end of said spring being pivotally mounted relative to said support, a license plate support, and a curved support arm secured to said license plate support and extending through said spring so that the latter conforms to the curvature of and frictionally engages said support arm.

7. A hinge assembly comprising an axially coiled spring, means mounting the ends of said spring at spaced points on a fixed support, a movable support for a member to be hinged, and a curved support arm secured to said movable support and extending through said spring so that the latter conforms to the curvature of and frictionally engages said support arm.

References Cited in the file of this patent

UNITED STATES PATENTS

| | | |
|---|---|---|
| 1,496,934 | Holtz | June 10, 1924 |
| 2,310,416 | Galamb | Feb. 9, 1943 |
| 2,591,196 | Post | Apr. 1, 1952 |

FOREIGN PATENTS

| | | |
|---|---|---|
| 425,634 | Great Britain | Mar. 19, 1935 |